July 28, 1925.
I. MAHONEY
1,547,817
DISPLAY DEVICE OR KALEIDOSCOPE
Filed Aug. 22, 1921
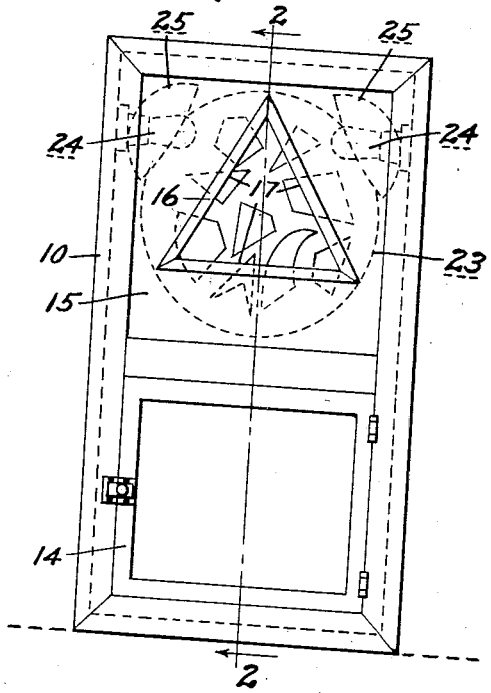
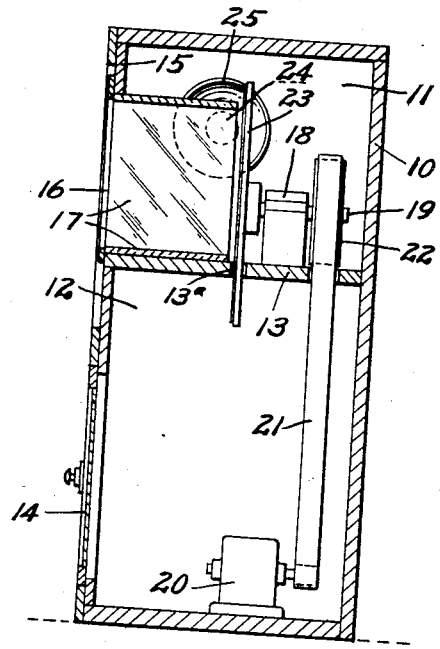
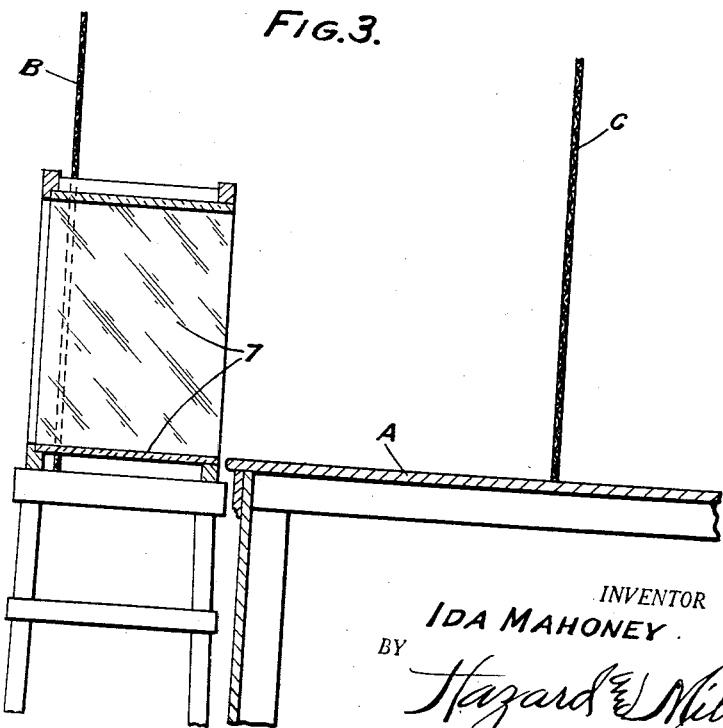
INVENTOR
IDA MAHONEY
BY
Hazard & Miller
ATTORNEYS.

Patented July 28, 1925.

1,547,817

UNITED STATES PATENT OFFICE.

IDA MAHONEY, OF LOS ANGELES, CALIFORNIA.

DISPLAY DEVICE OR KALEIDOSCOPE.

Application filed August 22, 1921. Serial No. 494,163.

*To all whom it may concern:*

Be it known that I, IDA MAHONEY, a citizen of the United States, residing at Los Angeles, in the county of Los Angeles and State of California, have invented new and useful Improvements in Display Devices or Kaleidoscopes, of which the following is a specification.

My invention relates to display devices or kaleidoscopes, the principal objects of my invention being to provide a relatively simple, easily operated and effective display device, utilizing a rotary member and a series of reflecting surfaces that are disposed in angular arrangement with respect to each other so as to produce kaleidoscopic effects when the rotary member, carrying various colored objects, is rotated, and, further, to provide an attractive display device that may be advantageously employed in the show or display windows of stores and shops, as a pleasing and interesting plaything for children, or as an appliance for producing novel effects upon the stage.

With the foregoing and other objects in view, my invention consists in certain novel features of construction and arrangement of parts that will be hereinafter more fully described and claimed, and illustrated in the accompanying drawings, in which:

Fig. 1 is a front elevational view of a display device of my improved construction.

Fig. 2 is a vertical section taken on the line 2—2 of Fig. 1.

Fig. 3 is a vertical section taken through the center of a device embodying the principles of my invention, and which is adapted for producing novel scenic effects upon a stage or platform.

Referring by numerals to the accompanying drawings, and particularly to the form of device illustrated in Figs. 1 and 2, 10 designates a housing that may be formed of any suitable material and in any suitable size, and the space within said housing is divided into an upper compartment 11 and a lower compartment 12 by a horizontally disposed partition 13. The front of the lower compartment 10 is normally closed by a door 14 and the front of the upper compartment 11 is closed by a panel 15 that is provided with an opening 16 having the form of an equi-lateral triangle.

A series of three mirrors 17, or members having reflecting surfaces, are arranged in the front portion of the upper compartment 11 with their front edges positioned against the edges of the triangular opening 16. Inasmuch as these mirrors or reflecting surfaces are arranged substantially 60° apart and the reflecting surfaces are inwardly presented, each surface will reflect the other two surfaces and all reflections thereupon.

Formed in partition 13 to the rear of the mirrors or reflecting surfaces, is a transversely disposed slot 13ª, and supported upon the partition to the rear of said slot is a bearing 18 for a horizontally disposed shaft 19.

This shaft may be driven in any suitable manner, either by a crank handle or by a small electric motor such as 20, and which latter drives a belt 21 that passes around a pulley 22 that is carried by the rear end of shaft 19.

Secured on the forward end of shaft 19 and positioned a short distance to the rear of the rear edges of the mirrors or reflecting surfaces 17, is a disc 23 the lower edge of which projects through slot 13ª in the partition 13, and the front face of this disc may be painted in different colors, or differently colored objects may be indiscriminately arranged thereupon. For instance, if the device is used for displaying differently colored fabrics, small sections of the different pieces or patterns of the fabrics may be secured to the front face of the disc; or, for a display of jewelry or like small articles of merchandise, the latter may be secured to the disc by means of suitable fastening devices such as invisible wires or small tacks.

Suitably located within the compartment 11, and preferably to the sides of the relatively narrow opening between the rear ends of the mirrors 17 and the disc 23, are electric lamps 24 behind which are located suitable reflectors 25 and the latter being arranged so as to direct rays of light from said lamps over the front face of the disc 23 and the objects positioned thereupon.

As the object-carrying disc is rotated, the moving objects carried by the front of the disc will be reflected by the mirrors 17, with the result that kaleidoscopic effects will be produced, and which may be observed by persons standing in front of the device and looking against the reflecting surfaces of said mirrors.

The larger forms of display devices constructed as herein set forth may be advantageously utilized in show windows and the like for attracting attention of passers-by to merchandise displayed in the show window adjacent to the device; and the smaller sizes provide interesting and amusing toys or playthings for children.

Where the device is utilized for producing novel effects on a stage or platform, the triangular set of mirrors or reflecting surfaces is positioned immediately in front of a stage or platform A. as illustrated in Fig. 3, with a curtain B. arranged above and to the sides of the mirrors and a second curtain C. positioned a short distance behind the mirrors.

With such an arrangement, the image of a performer positioned on the stage immediately to the rear of the mirrors is reflected in the latter in various positions, and the reflected images may be readily observed by persons positioned in front of said mirrors.

A display device of my improved construction is comparatively simple, may be easily and cheaply produced and is very effective in performing its intended functions.

It will be understood that minor changes in the size, form and construction of the various parts of my improved display device may be made and substituted for those herein shown and described without departing from the spirit of my invention, the scope of which is set forth in the appended claims.

I claim as my invention:

1. A display device or kaleidoscope comprising a cabinet, the front wall of the cabinet being provided with an opening, a reflecting body in the cabinet and communicating with said opening, a display member, means for moving said display member across the inner end of said body and spaced therefrom, and a source of light within said cabinet and located in front and at the side of said display member for projecting rays of light directly upon the face of said display member.

2. A display device or kaleidoscope comprising a cabinet, the front wall of the cabinet being provided with an opening, a reflecting body tubular in cross section in the cabinet and communicating with said opening, a display disc spaced from the inner end of said reflecting body, means for rotating said display disc in a plane across the inner end of said reflecting body, and a source of light within said cabinet projecting rays of light directly upon the face of said disc which is adjacent to said reflecting body.

3. A display device or kaleidoscope comprising a tubular reflecting body triangular in cross section, a display disc spaced from said reflecting body, means for rotating said display disc in a plane across one end of said reflecting body, and a source of light outside of said reflecting body and located at the side and front of said display disc for projecting rays of light upon the face of the display disc.

In testimony whereof I have signed my name to this specification.

IDA MAHONEY.